(12) United States Patent
Van Vuuren

(10) Patent No.: US 9,273,581 B2
(45) Date of Patent: Mar. 1, 2016

(54) PURGE SYSTEM FOR REDUCTANT DELIVERY UNIT FOR A SELECTIVE CATALYTIC REDUCTION SYSTEM

(71) Applicant: Continental Automotive Systems, Inc., Auburn Hills, MI (US)

(72) Inventor: Willem Nicolaas Van Vuuren, Yorktown, VA (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 240 days.

(21) Appl. No.: 14/062,120

(22) Filed: Oct. 24, 2013

(65) Prior Publication Data

US 2015/0115051 A1 Apr. 30, 2015

(51) Int. Cl.
*F01N 3/20* (2006.01)

(52) U.S. Cl.
CPC .............. *F01N 3/2066* (2013.01); *F01N 3/208* (2013.01); *F01N 2610/02* (2013.01); *F01N 2610/144* (2013.01); *F01N 2610/1433* (2013.01); *F01N 2610/1453* (2013.01); *F01N 2610/1493* (2013.01)

(58) Field of Classification Search
CPC ......... F01N 3/2066; F01N 3/208; F01N 3/24; F01N 2610/02; F01N 2610/14; F01N 2610/1433; F01N 2610/144; F01N 2610/1453; F01N 2610/1493; B01D 53/94; B01D 53/9495
See application file for complete search history.

(56) References Cited

U.S. PATENT DOCUMENTS

| | | | |
|---|---|---|---|
| 2008/0236147 A1* | 10/2008 | Van Vuuren et al. | 60/295 |
| 2011/0099983 A1* | 5/2011 | Ohno | 60/277 |
| 2012/0020857 A1 | 1/2012 | Isada et al. | |
| 2013/0000743 A1* | 1/2013 | Crary | 137/15.04 |
| 2013/0205756 A1* | 8/2013 | Levin et al. | 60/274 |
| 2013/0276430 A1* | 10/2013 | Ulrich et al. | 60/274 |
| 2014/0238504 A1* | 8/2014 | Kregling et al. | 137/101.31 |
| 2015/0204225 A1* | 7/2015 | Wu et al. | F01N 3/2066 |

OTHER PUBLICATIONS

Great Britain Intellectual Property Office Search Report dated Sep. 4, 2014.

* cited by examiner

*Primary Examiner* — Darren W Gorman

(57) ABSTRACT

A purge procedure which is part of an injector, that may be used as part of a reductant delivery unit (RDU), where the RDU is part of a selective catalytic reduction system for injecting diesel exhaust fluid into an exhaust system, to control exhaust emissions. The RDU delivers a reductant carrier to the engine exhaust system. The purge process includes a control strategy to improve the quality of the purge cycle (i.e., increase the amount of fluid evacuated). The sequence of the purge event is adjusted in order to generate a strong vacuum in the fluid supply line and the injector—this enhances the efficiency of the purge by increasing the initial flow rates through the injector. However, upon opening the injector, the pressure inside the fluid path increases to a level just below the ambient pressure outside the injector, therefore the gas flow rate is substantially reduced.

13 Claims, 3 Drawing Sheets

PURGE SYSTEM FOR REDUCTANT DELIVERY UNIT FOR A SELECTIVE CATALYTIC REDUCTION SYSTEM

FIELD OF THE INVENTION

The invention relates generally to a purge procedure for a reductant delivery unit which is part of a selective catalytic reduction system.

BACKGROUND OF THE INVENTION

New emissions legislation in Europe and North America is driving the implementation of new exhaust aftertreatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide emissions (NOx), that are difficult to treat in oxygen-rich exhaust environments characteristic of lean-burn combustion. Exhaust aftertreatment technologies are currently being developed that treat NOx under these conditions.

One of these technologies includes a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR). Ammonia is difficult to handle in its pure form in the automotive environment, therefore it is customary with these systems to use a liquid aqueous urea solution, typically at a 32% concentration of urea ($CO(NH_2)_2$). The solution is referred to as AUS-32, and is also known under its commercial name of AdBlue. The urea is delivered to the hot exhaust stream typically through the use of an injector, and is transformed into ammonia prior to entry in the catalyst. More specifically, the urea is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide ($CO_2$), the ammonia resulting from the thermolysis and the hydrolysis then undergoes a catalyzed reaction with the nitrogen oxides as described previously.

AUS-32, or AdBlue, has a freezing point of –11 C, and system freezing is expected to occur in cold climates. Since these fluids are aqueous, a volume expansion happens after the transition to the solid state upon freezing. This expanding ice can exert significant forces on any enclosed volumes, such as an injector, or fluid supply pipes. This expansion may cause damage to the injection unit, therefore, injection systems typically purge the injection unit when the engine shuts down to remove the fluid contained therein.

In the known system configurations, injector purging is used to remove fluid from the injector when the injector is not in use. It has been found that the efficiency of this method is not 100%, i.e., a certain amount of fluid remains in the injector unit. Although the amount of remaining fluid may not always be sufficient to risk damage to the injector upon freezing (expansion volume is available for the expanding ice), a risk remains that during engine hot soaks, the remaining fluid could be exposed to high temperature. This high temperature exposure could result in the decomposition of the AUS-32 which would also cause damage to the injection unit.

In other types of designs, it has been found that the remaining fluid tends to collect in the upper portion of the injector, in the volume between the filter and the inlet tube. Many types of injectors have O-rings which are used in combination with an injector cup to provide a sealing function, and prevent the remaining fluid from leaking. However, in some injectors, there is a potential leak path for the AUS-32 past the installed O-ring which cooperates with the injector cup to provide a sealing function. Although this sealing path created by the 0-ring is typically sufficient for liquids, it has been found that AUS-32 solution is prone to breaching seals of this type in the form of creeping urea crystals. At the fluid boundary layer, if there has been a minimal bypass of the sealing joint, fluid evaporates and leaves behind urea in its solid form. This provides a wicking path for more liquid urea solution, which establishes another boundary layer, evaporates, and leaves behind more solid urea. This creeping mechanism has often been observed on AUS-32 systems.

Accordingly, there exists a need for a way to purge an RDU, thereby sufficiently remove fluid from the RDU, and reduce or prevent the creeping mechanism as described above.

SUMMARY OF THE INVENTION

The purge procedure of the present invention is part of an injector, which may be used as part of a reductant delivery unit (RDU), where the RDU is part of a selective catalytic reduction (SCR) system for injecting diesel exhaust fluid (DEF) into an exhaust system, and is used to control exhaust emissions.

The RDU delivers a reductant carrier (e.g. aqueous urea solution) to the engine exhaust system. The solution is transformed into ammonia which then reacts with the exhaust oxides of nitrogen in a catalytic environment to produce nitrogen and $H_2O$. One type of urea, commercially known as AdBlue, has a freezing point of –11° C. In order to prevent component damage during freezing conditions, AdBlue injection systems remove fluid from the injector by purging. This invention improves the purging efficiency of the RDU.

In one embodiment, the present invention is a system for purging an injector, including a pumping mechanism having multiple modes of operation, an injector in fluid communication with the pumping mechanism, and a valve portion being part of the injector, where the valve portion has an open position and a closed position. The pumping mechanism is placed in a first mode of operation such that the pumping mechanism directs pressurized fluid to the injector, and the valve portion is changed between the open and closed positions to selectively dispense fluid into an exhaust flow path. The pumping mechanism may also be placed in a second mode of operation such that the pumping mechanism generates a vacuum when the valve portion is in the closed position, and the pumping mechanism directs fluid away from the injector when the valve portion is in the open position.

In another embodiment, the system of the present invention includes a pumping mechanism for transferring fluid, an injector, a valve portion which is part of the injector, where the valve portion is moveable between and open position, a closed position, and anywhere therebetween, and a purge valve in fluid communication with the pumping mechanism and the injector. The purge valve is placed in a first configuration such that the purge valve directs pressurized fluid from the pumping mechanism to the injector. The purge valve is placed in a second configuration such that the pumping mechanism generates a vacuum when the valve portion is in the closed position, and the purge valve directs fluid from the injector to the pumping mechanism when the valve portion is in the open position.

The purge valve includes a first portion and a second portion connected to the first portion. The pumping mechanism directs fluid from the first portion through the pumping mechanism, through the second portion and to the injector when the purge valve is in the first configuration. The pumping mechanism directs fluid away from the injector, through the first portion and through the pumping mechanism, when the purge valve is in the second configuration.

The purge process of the present invention includes a control strategy to improve the quality of the purge cycle (i.e., increase the amount of fluid evacuated from the RDU). The sequence of the purge event is adjusted in order to generate a strong vacuum in the fluid supply line and the injector—this enhances the efficiency of the purge by increasing the initial flow rates through the injector. However, upon opening the injector, the pressure inside the fluid path increases to a level just below the ambient pressure outside the injector, therefore the gas flow rate is substantially reduced.

The purge process of the present invention includes multiple vacuum generating sequences during the purge event. Initially, the pumping mechanism and the purge control valve are activated (or, in alternate embodiments, the pumping mechanism is activated in "reverse" mode), and the valve portion of the injector remains closed. After a predetermined time is reached, or if a predetermined vacuum level is attained, the valve portion of the injector is opened. The valve portion of the injector remains open for a predetermined time, or until the pressure rises to a predetermined level.

This cycle may then be repeated as many times as necessary. It is therefore an object of this invention to maximize the fluid volume evacuated from the injector. It is another object of this invention to provide an additional sealing barrier to reduce the sealing load of the existing sealing elements. It is another object of the invention to increase the amount of time that the gas flow rate is high and efficient for scavenging the injector, due to the high level of generated vacuum. It is yet another object of this invention to allow for the trapped fluid in the off-axis volumes (such as the volume bounded by the injector cup and the main gas stream) to flow back into the main gas stream—this permits the next wave of high intensity gas flow to remove this fluid which was previously trapped in the inaccessible volumes of the injector.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
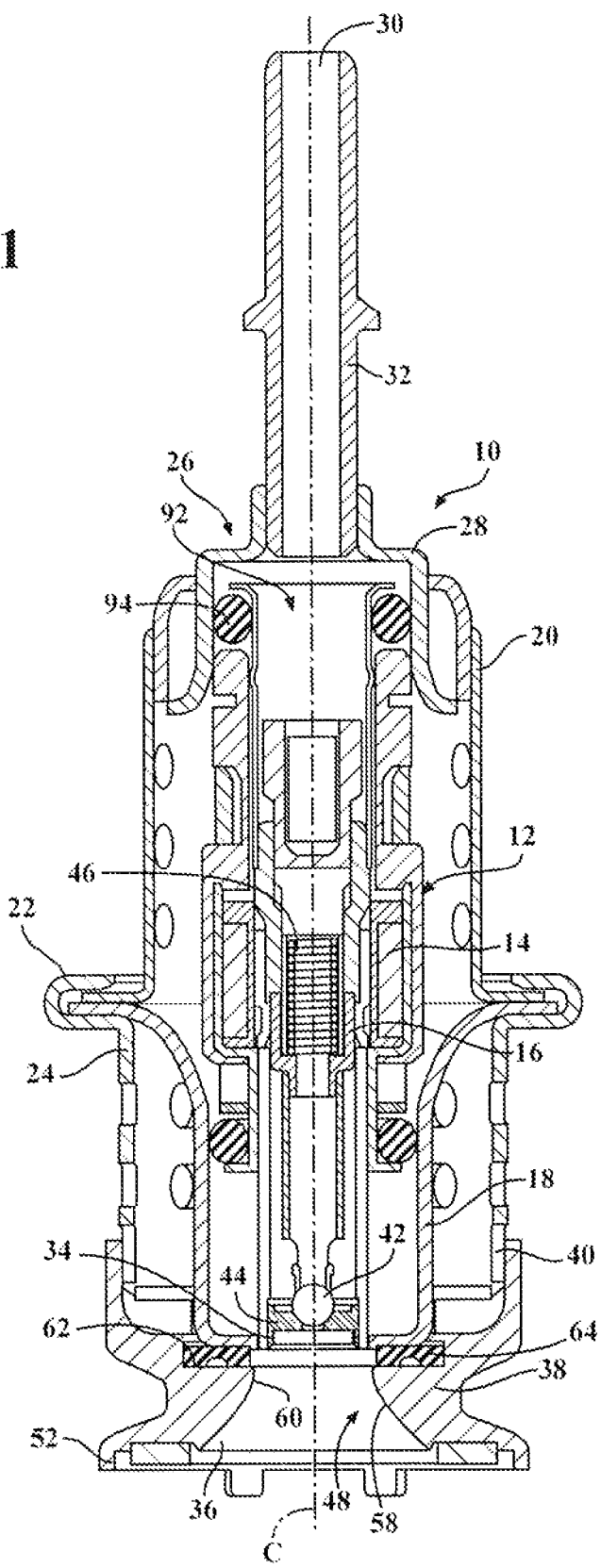
FIG. 1 is a sectional side view of a reductant delivery unit used as part of a purge procedure, according to embodiments of the present invention.

The following description of the preferred embodiment(s) is merely exemplary in nature and is in no way intended to limit the invention, its application, or uses.

A reductant delivery unit (RDU) having a valve portion which incorporates multiple vacuum generating sequences during a purge event is shown in the Figures generally at 10. The RDU 10 includes a solenoid fluid injector, generally indicated at 12, that provides a metering function of fluid and provides the spray preparation of the fluid into the exhaust path of a vehicle in a dosing application. Thus, the fluid injector 12 is constructed and arranged to be associated with an exhaust gas flow path upstream of a selective catalytic reduction (SCR) catalytic converter. The fluid injector 12 is preferably an electrically operated, solenoid fuel injector. Thus, the injector 12 has a coil 14 and a movable armature 16.

The fluid injector 12 is disposed in an interior carrier 18. An injector shield 20 is coupled to the carrier 18 by folding down tangs of a flange 22 of body 24 over shelf features of the carrier 18 and the shield 20. Thus, the shield 20 is fixed with respect to the injector 12. An inlet cup structure, generally indicated at 26, includes a cup 28 and an inlet tube 32 integral with the cup 28. The cup structure 26 is in fluid communication with an inlet 30 of the injector 12. The inlet tube 32 is in communication with a source of urea solution that is fed to the injector 12 to be injected from an injector outlet 34 of the injector 12. The injector outlet 34 is fluidly connected with a flange outlet 36 of an injector flange 38 that is coupled directly with an end 40 of the body 24. The injector 12 also includes a valve portion having a seal member 42 and a seat 44. When the coil 14 is energized, the seal member 42 of the armature 16 is lifted off the seat 44, moving the valve portion to an open position, permitting urea solution to pass through the injector outlet 34 to flange outlet 36. When the coil 14 is de-energized, a spring 46 biases the seal member 42 of the armature 16 into sealing engagement with the seat 44, changing the valve portion back to a closed position.

Figure 2:
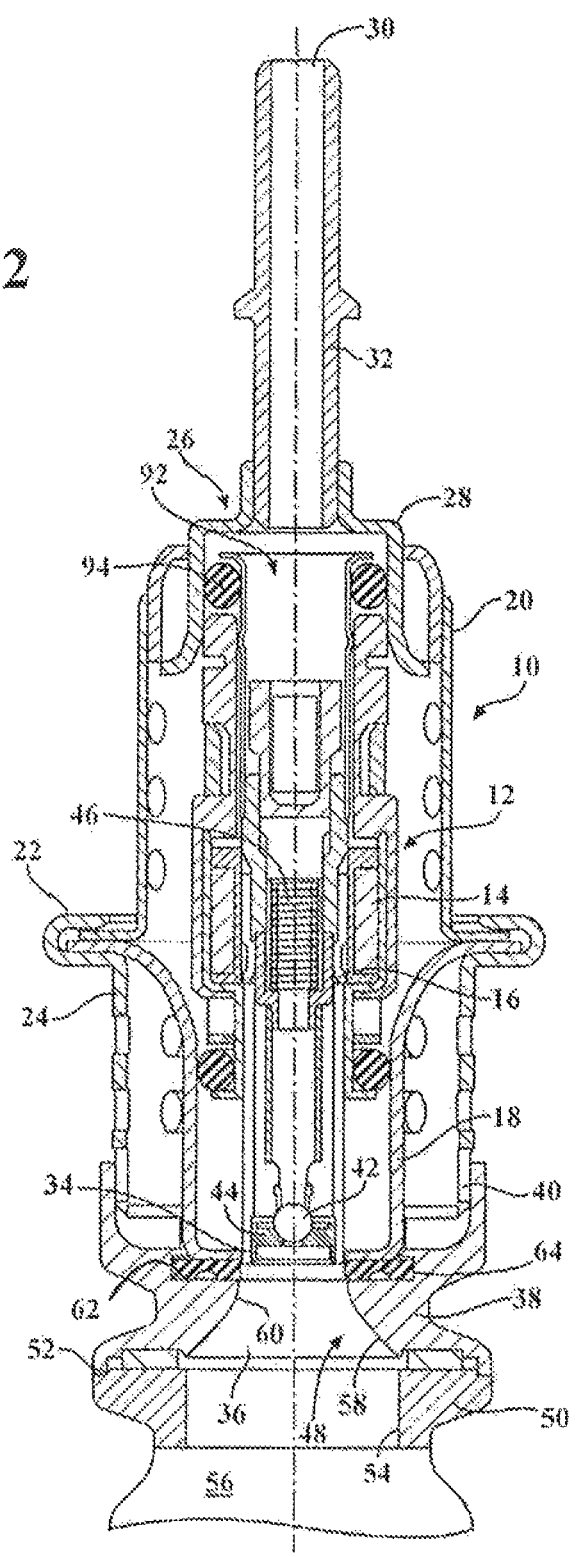
FIG. 2 is a sectional side view of a reductant delivery unit connected to an exhaust boss used as part of a purge procedure, according to embodiments of the present invention.

The injector flange 38 includes internal surface structure, generally indicated at 48, that defines the flange outlet 36 that delivers fluid into an exhaust boss 50 of an exhaust flow path. Thus, as shown in FIG. 2, the flange 38 is coupled to an end 52 of the exhaust boss 50 with the flange outlet 36 communicating with a bore 54 of the boss 50. The bore 54 communicates with the exhaust flow path 56. The flange 38 provides a mechanical support that mounts the injector 12 so that the tip is placed in a remote position with respect to the hot exhaust gases.

The internal surface structure 48 also includes a conical surface 58 that is joined with at least one radius surface 60. In the embodiment, the conical surface 58 defines the open end of the flange 38 and is joined with the radius surface 60, with the radius surface 60 being joined directly with a gasket shelf surface 62 of the flange 38. Thus, the conical surface 58 is downstream of the radius surface 60. The gasket shelf surface 62 is disposed generally perpendicular with respect to a longitudinal axis C of the injector 12. A gasket 64 rests on the gasket shelf surface 62 to seal the flange 38 with respect to the carrier 18.

Figure 3:
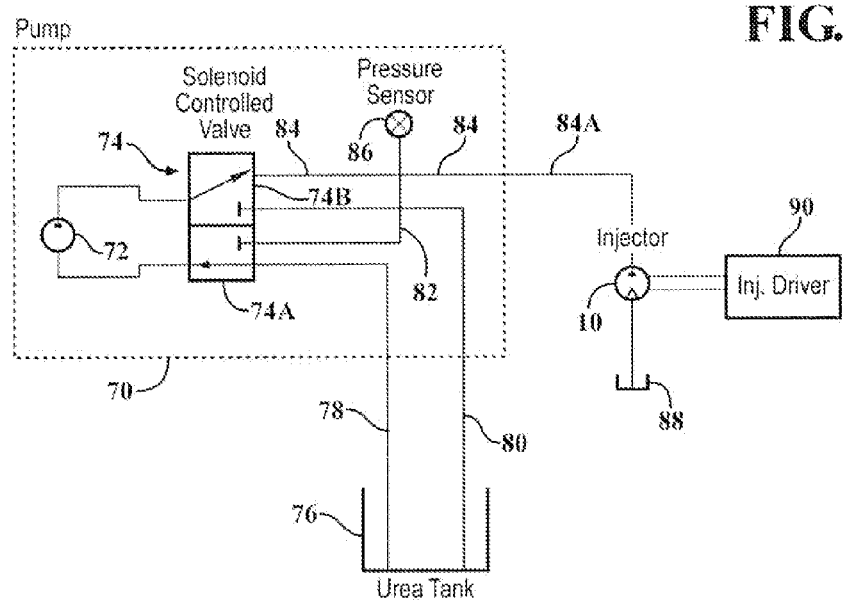
FIG. 3 is a diagram of system incorporating a purge procedure, according to embodiments of the present invention.

A diagram of an RDU 10 incorporated into an SCR system is shown in FIG. 3. The system includes a pump 70 having a pumping mechanism 72 in fluid communication with a solenoid control valve, shown generally at 74, which in this embodiment is a purge valve. The purge valve 74 has two portions, a first portion 74A, and a second portion 74B. The valve 74 is in fluid communication with a urea tank 76 through the use of a first conduit 78, and a second conduit 80. A third conduit 82 also provides fluid communication between the purge valve 74, a fourth conduit 84, and a pressure sensor 86. The fourth conduit 84 is also in fluid communication with the purge valve 74 and the RDU 10. The RDU 10 is in fluid communication with the exhaust flow path 88, and the operation of the RDU 10 is controlled by an injector driver 90.

Figure 4:
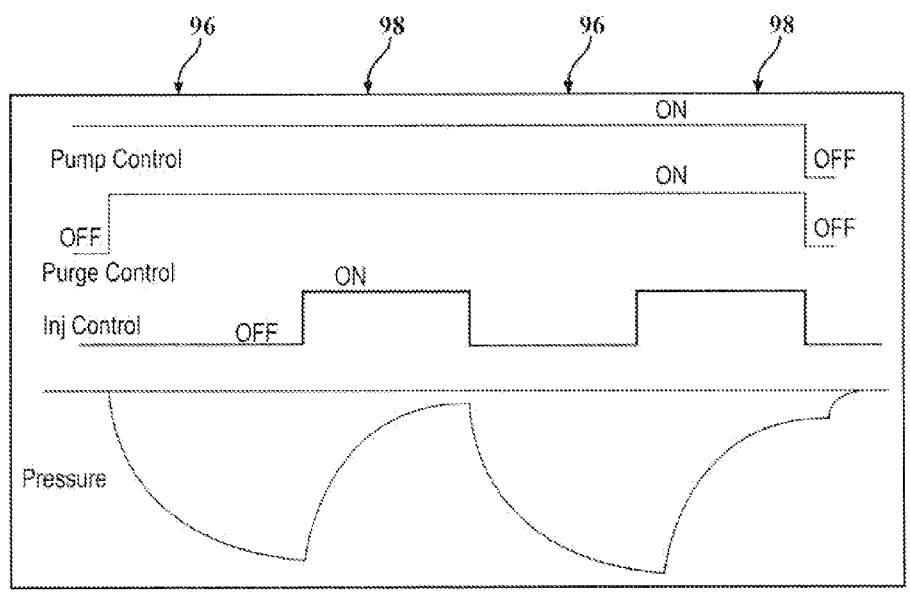
FIG. 4 is a diagram depicting the purge procedure, according to embodiments of the present invention.

Referring now to FIGS. 3 and 4, the operation of the cycle of the purge procedure of the SCR system involves several steps. The purge valve 74 is configurable is several ways. A first configuration of the purge valve 74 is shown in FIG. 3, where the first portion 74A provides fluid communication between the first conduit 78 and the pumping mechanism 72, and the second portion 74B provides fluid communication between the fourth conduit 84 and the pumping mechanism 72. When the purge valve 74 is in the first configuration, the pumping mechanism 72 pumps fluid from the urea tank 76 through the first conduit 78 and through the first portion 74A of the purge valve 74 such that the fluid flows through the pumping mechanism 72, through second portion 74B of the purge valve 74, through the fourth conduit 84, and to the RDU 10, where the injector 12 controls the amount of fluid dispensed into the exhaust flow path 88.

The purge valve 74 also includes a second configuration which is used during the cycle of the purge process. The first step of the cycle is shown generally at 96 in FIG. 4, where the pumping mechanism 72 is operating, and the purge valve 74 is changed to the second configuration. When the purge valve 74 is in the second configuration, the first portion 74A provides fluid communication between the third conduit 82 and the pumping mechanism 72, and the second portion 74B provides fluid communication between the second conduit 80 and the pumping mechanism 72. When the pumping mechanism 72 is operating, fluid is drawn to the pumping mechanism 72 from the third conduit 82 and the portion 84A of the fourth conduit 84 downstream of the third conduit 82 and upstream of the injector 12, creating a vacuum in the third conduit 82 and the portion 84A of the fourth conduit 84 when the valve portion is in the closed position. In the second configuration of the purge valve 74, the pumping mechanism 72 pumps any fluid drawn from the third conduit 82 and the portion 84A of the fourth conduit 84, through the first portion 74A of the purge valve 74, through the pumping mechanism 72, through the second portion 74B of the purge valve 74, and into the second conduit 80. When the valve portion is changed to the open position during the second step of the cycle, shown generally at 98 in FIG. 4, the vacuum generated in the third conduit 82 and fourth conduit 84 creates suction, and causes fluid to be drawn out of the injector 12.

During both the first step 96 and the second step 98, the pumping mechanism 72 is operating, and the purge valve 74 is in the second configuration. The valve portion of the injector 12 remains in the closed position when the purge valve 74 is changed to the second configuration to generate the vacuum. If the valve portion of the injector 12 is opened simultaneously as the purge valve 74 is changed to the second configuration, the vacuum is not generated.

Referring again to FIGS. 1-2, during the operation of the RDU 10, the fluid primarily collects in an upper cavity, shown generally at 92, and around an upper seal 94. Once the valve portion is opened after the vacuum is generated, the air flow through the injector 12 into the fourth conduit 84 draws at least a portion of the fluid into the fourth conduit 84 towards the purge valve 74. After the valve portion is moved to the open position, and, the air flow passes from the injector 12 into the fourth conduit 84, the vacuum pressure decreases until eventually the air flow stabilizes, and the vacuum is minimized or non-existent.

If it is desired to repeat the cycle, the valve portion is changed back to the closed position to generate the vacuum, and the valve portion is then changed to the open position to draw more fluid out of the injector 12. While two cycles are shown in FIG. 4, the steps 96,98 of the cycle may be repeated as many times as necessary to continue to remove fluid from the injector 12.

Alternate embodiments of the present invention are also possible. In one alternate embodiment, the solenoid purge valve 74 is not used, and the pumping mechanism 72 is directly in fluid communication with the first conduit 78 and the fourth conduit 84. In this embodiment, there is no second conduit 80 or third conduit 82, and the pressure sensor 86 is only in fluid communication with the fourth conduit 84.

In this embodiment, the pumping mechanism 72 has multiple modes of operation. In one mode of operation, the pumping mechanism 72 is operating in a forward mode, and the fluid is drawn from the urea tank 76 through the first conduit 78, and pumped through the pumping mechanism 72 such that the fluid flowing into the fourth conduit 84 is pressurized. The pressure of the fluid in the fourth conduit 84 is indicated by the pressure sensor 86. The fluid in the fourth conduit 84 flows into the RDU 10, and the injector 12 controls the amount of pressurized fluid dispensed into the exhaust flow path 88.

The pumping mechanism 72 also has another mode of operation used during the purge process, where the pumping mechanism 72 operates in a reverse mode, and fluid is drawn out of the fourth conduit 84, and forced into the first conduit 78 by the pumping mechanism 72. When the valve portion of the injector 12 is closed, the pumping mechanism 72 is operating in a reverse mode, a vacuum is generated in the fourth conduit 84 and the RDU 10, such that when the valve portion of the injector 12 is open, fluid remaining the upper cavity 92 is drawn out by the air flow from the injector 12 into the fourth conduit 84.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    a pumping mechanism;
    an injector in fluid communication with the pumping mechanism, the injector including a valve portion movable between an open position and a closed position; and
    an injector driver constructed and arranged to cyclically control the valve portion during a single purge event 1) to cause the valve portion to move to the closed position while the pumping mechanism generates a vacuum, and 2) to cause the valve portion to move to the open position while the injector is under vacuum so that fluid is directed away from the injector.

2. The apparatus of claim 1, further comprising:
    an exhaust flow path;
    wherein the valve portion is constructed and arranged to be selectively moved between the open position and the closed position to selectively direct fluid into the exhaust flow path.

3. The apparatus of claim 1, further comprising:
    a urea tank;

wherein the fluid is urea stored in the urea tank, and the pumping mechanism is constructed and arranged to draw fluid from the urea tank and to direct the fluid to the injector.

4. An apparatus comprising:
a pumping mechanism for transferring fluid;
an injector including a valve portion moveable between an open position, a closed position, and anywhere therebetween;
a purge valve in fluid communication with the pumping mechanism and the injector; and
an injector driver constructed and arranged to cyclically control the valve portion during a single purge event 1) to cause the valve portion to move to the closed position while the purge valve and the pumping mechanism cause a vacuum to be generated at the injector and 2) to cause the valve portion to move to the open position while the injector is under vacuum so that fluid is directed away from the injector.

5. The apparatus of claim 4, the purge valve further comprising:
a first portion; and
a second portion connected to the first portion;
wherein the pumping mechanism is constructed and arranged to direct fluid from the first portion through the pumping mechanism, through the second portion and to the injector, and the pumping mechanism is constructed and arranged to direct fluid away from the injector, through the first portion and through the pumping mechanism.

6. The apparatus of claim 5, further comprising:
a first conduit selectively in fluid communication with the first portion of the purge valve;
a second conduit selectively in fluid communication with the second portion of the purge valve; and
a third conduit in fluid communication with a fourth conduit, and selectively in fluid communication with the first portion of the purge valve with the fourth conduit being in fluid communication with the injector, and selectively in fluid communication with the second portion of the purge valve;
wherein the first portion of the purge valve is constructed and arranged to place the first conduit in fluid communication with the pumping mechanism and the second portion of the purge valve is constructed and arranged to place the fourth conduit in fluid communication with the pumping mechanism, and the first portion of the purge valve is constructed and arranged to place the third conduit in fluid communication with the pumping mechanism and the second portion of the purge valve is constructed and arranged to place the second conduit in fluid communication with the pumping mechanism.

7. A method for purging an injector of a reductant delivery system, the system further comprising a pumping mechanism, and a solenoid control valve in fluid communication with the pumping mechanism and the injector, the injector having a valve portion movable between open and closed positions, the method comprising the steps of:
a) when the injector contains fluid, operating the pumping mechanism and the solenoid control valve such that the pumping mechanism generates a vacuum when the valve portion is in the closed position,
b) while the injector is under vacuum and after a predetermined amount of time, opening the valve portion to draw fluid out of the injector, and
during a single purging event, repeating steps a) and b) if fluid remains in the injector.

8. The method for purging an injector of claim 7, further comprising the steps of:
providing a first portion as part of the solenoid control valve, the first portion being in fluid communication with the pumping mechanism; and
providing a second portion as part of the solenoid control valve and connected to the first portion, the second portion being in fluid communication with the pumping mechanism;
directing fluid from the first portion through the pumping mechanism, through the second portion and to the injector;
directing fluid away from the injector, through the first portion, and through the pumping mechanism.

9. The method for purging an injector of claim 8, further comprising the steps of:
providing a first conduit selectively in fluid communication with the first portion of the solenoid control valve;
providing a second conduit selectively in fluid communication with the second portion of the solenoid control valve;
providing a third conduit in fluid communication with a fourth conduit, and selectively in fluid communication with the first portion of the solenoid control valve with the fourth conduit being in fluid communication with the injector, and selectively in fluid communication with the second portion of the solenoid control valve;
placing the solenoid control valve in a first configuration, such that the first portion of the solenoid control valve places the first conduit in fluid communication with the pumping mechanism and the second portion of the solenoid control valve places the fourth conduit in fluid communication with the pumping mechanism; and
placing the solenoid control valve in a second configuration, such that the first portion of the solenoid control valve places the third conduit in fluid communication with the pumping mechanism and the second portion of the solenoid control valve places the second conduit in fluid communication with the pumping mechanism.

10. The method for purging an injector of claim 9, further comprising the steps of:
providing a urea tank in fluid communication with the first conduit and the second conduit;
transferring fluid through the first conduit into the first portion of the solenoid control valve when the solenoid control valve is in the first configuration;
transferring fluid from the pumping mechanism through the second portion of the solenoid control valve, through the second conduit and into the urea tank when the solenoid control valve is in the second configuration.

11. The method for purging an injector of claim 7, further comprising the steps of opening and closing the valve portion intermittently to repeatedly generate the vacuum to create suction to remove excess fluid from the injector.

12. The method for purging an injector of claim 7, wherein the repeating step includes placing the valve portion in the closed position to regenerate the vacuum after the valve portion is placed in the open position for a predetermined amount of time.

13. The method for purging an injector of claim 7, wherein the repeating step includes placing the valve portion in the closed position to regenerate the vacuum after the valve portion is placed in the open position and a predetermined pressure level is attained.

* * * * *